(12) United States Patent
Esmailian et al.

(10) Patent No.: US 9,094,247 B2
(45) Date of Patent: Jul. 28, 2015

(54) CONTINUOUS ADAPTATION OF A CHANNEL EQUALIZER

(71) Applicant: Broadcom Corporation, Irvine, CA (US)

(72) Inventors: Tooraj Esmailian, Mission Viejo, CA (US); John Lock Creigh, Rancho Santa Margarita, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/095,348

(22) Filed: Dec. 3, 2013

(65) Prior Publication Data

US 2015/0156039 A1    Jun. 4, 2015

(51) Int. Cl.
*H03K 5/159* (2006.01)
*H04L 25/03* (2006.01)

(52) U.S. Cl.
CPC .................... *H04L 25/03019* (2013.01)

(58) Field of Classification Search
CPC ................... H04L 25/03038; H04L 25/03057; H03H 21/0012

USPC ................... 375/232, 229, 233; 708/322, 323
See application file for complete search history.

(56) References Cited

U.S. PATENT DOCUMENTS

| 8,842,767 B2 * | 9/2014 | Esmailian et al. ............. 375/285 |
| 2003/0156603 A1 * | 8/2003 | Rakib et al. .................... 370/485 |
| 2007/0014378 A1 * | 1/2007 | Parhi et al. ..................... 375/267 |

* cited by examiner

Primary Examiner — Khai Tran
(74) Attorney, Agent, or Firm — Sterne, Kessler, Goldstein & Fox P.L.L.C.

(57) ABSTRACT

The present disclosure is directed to a system and method for continually adapting a channel equalizer that includes a precoder based on changing channel conditions. The precoder is described as being implemented in the exemplary context of a 10GBASE-T physical layer (PHY) device. 10GBASE-T is defined by the Institute of Electrical and Electronics Engineers (IEEE) 802.3an standard and uses four pairs of copper transmission lines to provide an aggregate data rate of 10 gigabits per second. In this exemplary context, the system and method of the present disclosure are configured to exploit an undefined, auxiliary bit in the 10GBASE-T transmission frame to continually send updates to the coefficients of the precoder based on changing channel conditions. The updates can be sent in the transmission frames together with application-level data.

20 Claims, 6 Drawing Sheets

US 9,094,247 B2

CONTINUOUS ADAPTATION OF A CHANNEL EQUALIZER

TECHNICAL FIELD

This application relates generally to channel equalization.

BACKGROUND

Communication systems are designed to transfer information between two devices over a medium in the presence of disturbing influences. Intersymbol interference (ISI) is one well-known disturbing influence in which transmitted symbols become elongated and interfere with adjacently transmitted symbols. This spreading of symbols is generally caused by the non-ideal frequency response associated with all communication mediums. Because ISI has a similar effect as noise, communication is made less reliable.

One of the most basic solutions for mitigating the effects of ISI is slowing down the speed at which symbols are transmitted over the medium. More specifically, the transmission speed can be slowed down such that a symbol is only transmitted after allowing previously transmitted symbol pulses to dissipate. Although slowing down the speed at which symbols are transmitted can eliminate the effects of ISI, it is generally an unacceptable solution for many of today's communication applications. In fact, many of today's communication applications require speeds in the multi-gigabit per second range. At such high speeds, ISI can completely overwhelm a signal transmitted over even a few inches of printed circuit board trace, a few feet of copper cable, or a few tens of meters of optical fiber.

Therefore, a filtering process, referred to as equalization, is often used to flatten the frequency response of a communication medium to mitigate the effects of ISI. Equalization can be applied at the receiver and/or at the transmitter using a precoding technique. Precoding uses channel state information of the communication medium to pre-equalize symbols before they are transmitted to compensate for the expected ISI from one or more earlier transmitted symbols.

An issue with precoding is that the channel state information generally must be derived at the receiver and then fed back to the transmitter (due, for example, to part of the overall channel equalizer still being implemented at the receiver), and many communication standards do not provide a mechanism to continually perform this process. Instead, the channel state information is usually only derived once at the receiver and then fed back to the transmitter at startup, before application-level data is exchanged between the two devices. Because ISI can change over time with temperature, positioning, and the impedance of the communication medium, for example, the inability to continually adapt the precoder at the transmitter can lead to an increased bit error rate at the receiver.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
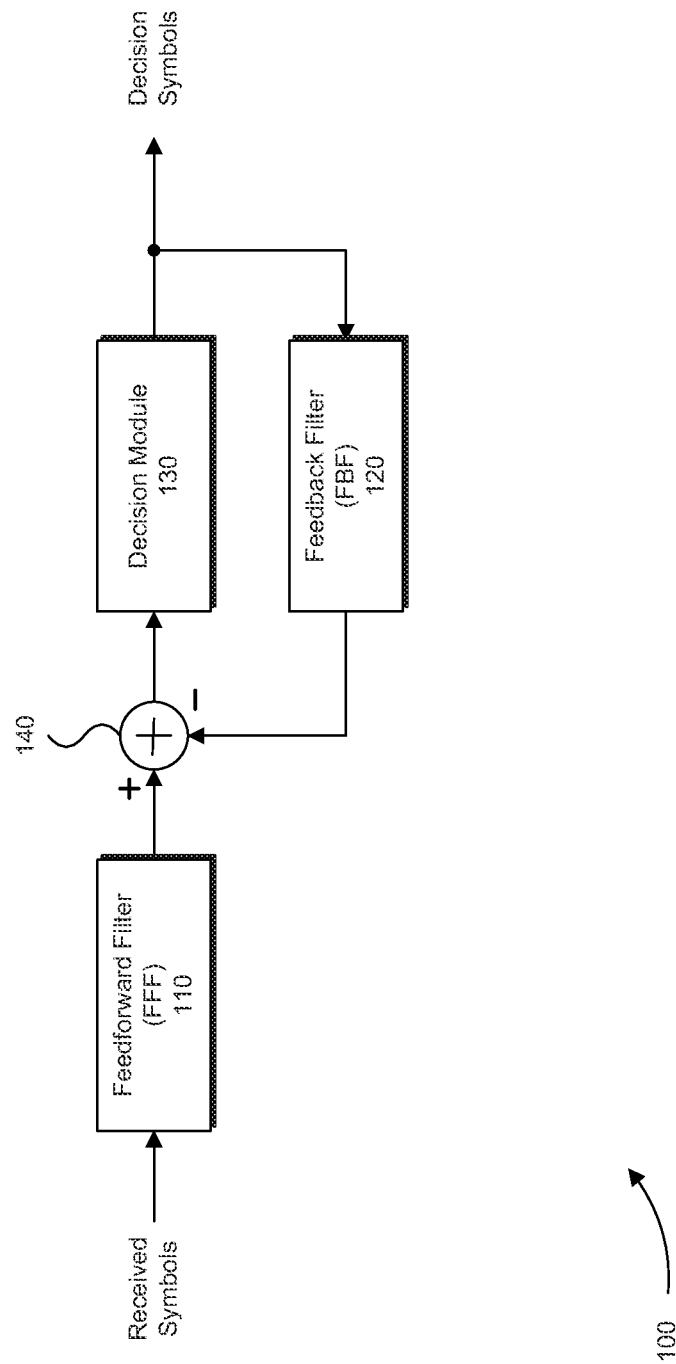
FIG. 1 illustrates a block diagram of a decision feedback equalizer (DFE).

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include software, firmware, or hardware (such as one or more circuits, microchips, processors, and/or devices), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

I. OVERVIEW

The present disclosure is directed to a system and method for adapting a channel equalizer that includes a precoder based on changing channel conditions. The precoder is described below as being implemented in the exemplary context of a 10GBASE-T physical layer (PHY) device. 10GBASE-T is defined by the Institute of Electrical and Electronics Engineers (IEEE) 802.3an standard and uses four pairs of copper transmission lines to provide an aggregate data rate of 10 gigabits per second. In this exemplary context, the system and method of the present disclosure are configured to exploit an undefined, auxiliary bit in the 10GBASE-T transmission frame to send updates to the coefficients of the precoder based on changing channel conditions. The updates can be sent in the transmission frames together with application-level data. These and other features of the present disclosure are described further below.

II. SYSTEM AND METHOD FOR CONTINUOUS ADAPTATION OF A CHANNEL EQUALIZER THAT INCLUDES A PRECODER

To provide some context for the system and method of the present disclosure, an example block diagram of a decision feedback equalizer (DFE) 100 is initially described with reference to FIG. 1. As shown in FIG. 1, DFE 100 includes a feed-forward filter (FFF) 110, a feedback filter (FBF) 120, a decision module 130, and a combiner 140. In general, DFE 100 is a non-linear equalizer that is commonly used in a receiver to reduce intersymbol interference (ISI) from symbols received over a channel. There are two specific types of ISI that DFE 100 can be used to reduce: pre-cursor ISI and post-cursor ISI. Pre-cursor ISI refers to interference caused by one or more symbols that are received after a current symbol, whereas post-cursor ISI refers to interference caused by one or more symbols that are received before a current symbol.

FFF 110 is configured to reduce the negative influence of pre-cursor ISI on a current symbol received over the channel and, potentially, whiten the noise. In one implementation, a series of delay elements and taps are used by FFF 110 to compensate for pre-cursor ISI contributed by one or more future symbols on the current symbol. The future symbols are stored in and tapped from the series of delay elements. The tapped values are then multiplied by respective tap weights (or filter coefficients) that are related to the extent of pre-cursor ISI contributed by the future symbols. After being multiplied, the resulting products are subtracted from the current symbol being processed by FFF 110 to reduce pre-cursor ISI.

Figure 2:
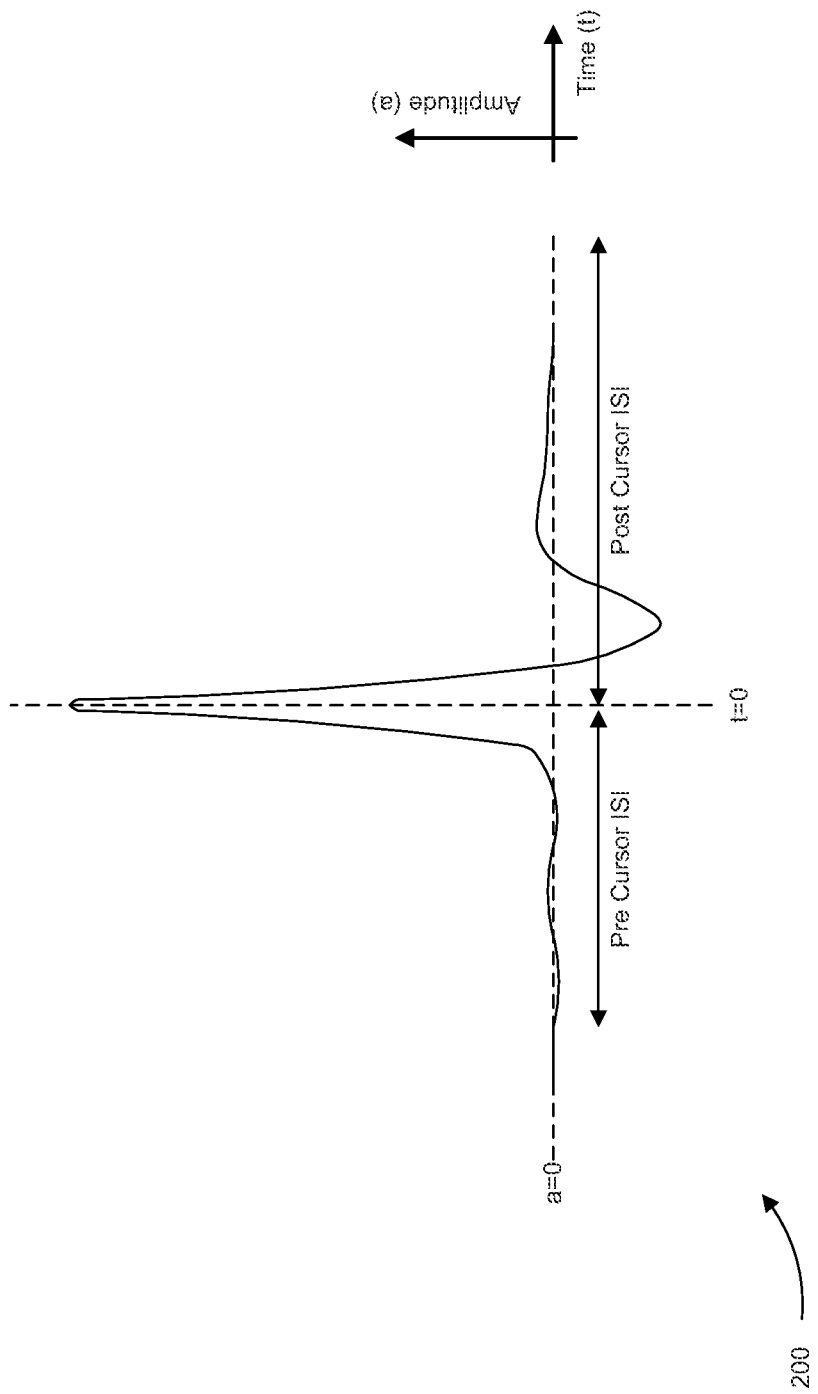
FIG. 2 illustrates an example of a channel impulse response.

The tap weights of FFF 110 are specifically determined, either directly or indirectly, based on the impulse response of the channel over which the symbols processed by DFE 100 are received. An example of such a channel impulse response 200 is illustrated in FIG. 2, with the portion of channel impulse response 200 to the left of time zero being the part responsible for causing pre-cursor ISI and the portion of channel impulse response 200 to the right of time zero being the part responsible for causing post-cursor ISI. Under ideal circumstances, channel impulse response 200 consists of a single impulse at time zero. The tap weights of FFF 110 are determined to compensate for the non-ideal portion of channel impulse response 200 to the left of time zero to reduce pre-cursor ISI.

Referring back to FIG. 1, FBF 120 is configured to reduce the negative influence of post-cursor ISI on a current symbol received over the channel and output by FFF 110. As noted above, post-cursor ISI refers to the interference of one or more past symbols on a current symbol. Thus, once the value of a received symbol is decided by decision module 130, that value can be fed back to FBF 120 where it can be used to reduce post-cursor ISI on a current symbol.

In one implementation, a series of delay elements and taps are used by FBF 120 to compensate for post-cursor ISI contributed by one or more previously decided symbols on a current symbol. The previously decided symbols are stored in the series of delay elements within FBF 120 and are multiplied by respective tap weights (or filter coefficients) that are related to the extent of post-cursor ISI contributed by the decided symbols. The resulting products are then subtracted by combiner 140 from the current symbol output by FFF 110 to reduce post-cursor ISI.

The tap weights of FBF 120 are specifically determined, either directly or indirectly, based on the impulse response of the channel over which the symbols processed by DFE 100 are received and also, for example, based on the spectral shape of the noise in the channel. Again, referring to the example channel impulse response 200 illustrated in FIG. 2, under ideal circumstances, channel impulse response 200 consists of a single impulse at time zero. The tap weights of FBF 120 are determined to compensate for, among other things, the non-ideal portion of channel impulse response 200 to the right of time zero to reduce post-cursor ISI.

The output of combiner 140 represents equalized data (in this case, data that has been equalized for both post-cursor and pre-cursor ISI). Decision module 130 is configured to receive the equalized data as a series of symbols and estimate which symbol was transmitted. Removal of ISI from the symbols, which effectively acts as noise, helps to ensure symbol values are decided correctly by decision module 130. The output of decision module 130 (ideally) represents the original symbols transmitted over the channel.

One well known issue with DFE 100 (and, in general, all DFEs) is that a decision error at the output of decision module 130 will cause a corrupted estimate of post-cursor ISI to be generated at the output of FBF 120. This decision error, in turn, can corrupt the signal at the input of decision module 130. This phenomenon, where one decision error at the output of decision module 130 can effect one or more future decisions, is called error propagation.

In communication systems that use error correcting codes to provide large coding gains, like 10GBASE-T systems, decision module 130 can be expected to produce a large number of decision errors at its output. Therefore, to avoid DFE error propagation in such systems, precoding, or what is commonly referred to as Tomlinson-Harashima Precoding (THP), is used.

The basic idea of THP is to move FBF 120 and combiner 140 to the transmitter, where past transmitted symbols are known so there is no possibility of decision errors being fed back to FBF 120.

Figure 3:
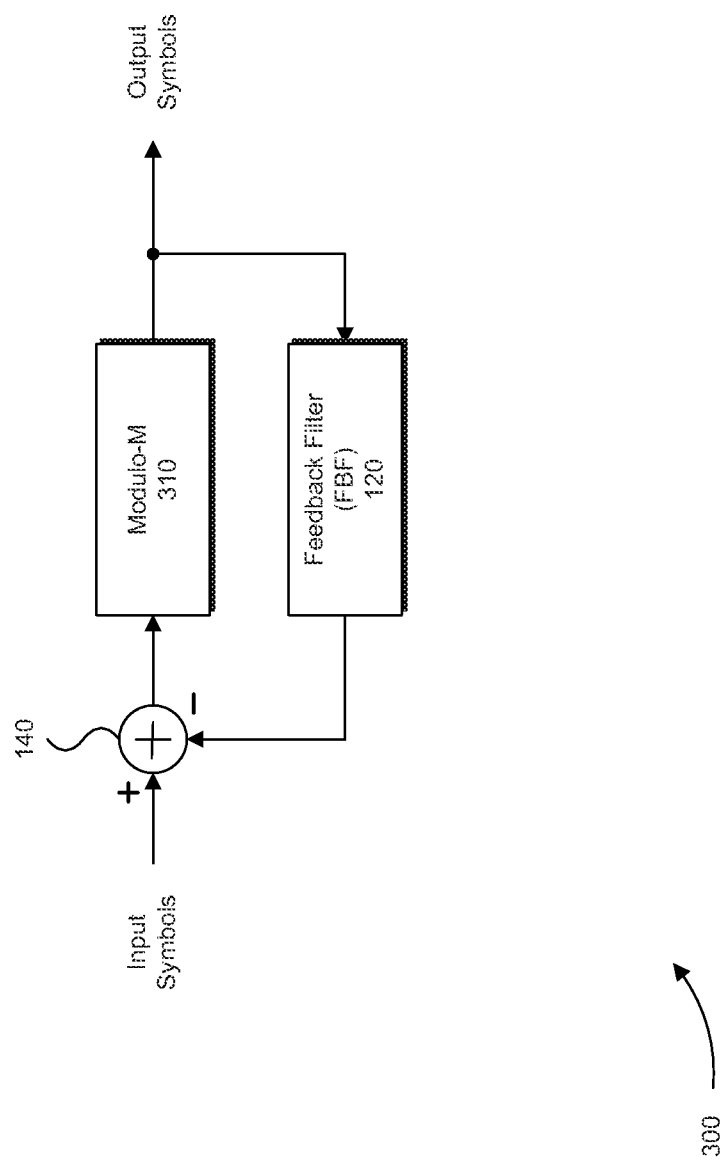
FIG. 3 illustrates an example block diagram of a precoder that implements Tomlinson-Harashima Precoding (THP) in accordance with embodiments of the present disclosure.

FIG. 3 illustrates an example block diagram of a precoder 300 that implements THP in accordance with embodiments of the present disclosure. The newly added modulo-M block 310 is configured to ensure that the output symbols of precoder 300 are limited to the range of (−M, M]. In general, if the output of combiner 140 is less than or equal to −M, an integer multiple of 2M is added to its output such that the total remains in the range of (−M, M]. On the other hand, if the output of combiner 140 is greater than M, some integer multiple of 2M is subtracted from its output such that the total remains in the range of (−M,M]. It should be highlighted again that the FFF remains at the receiver side but typically with the addition of a modulo-M block, similar to modulo-M block 310, for processing its output.

One issue with using a precoder, such as precoder 300, at the transmitter in conjunction with a FFF at the receiver to perform channel equalization is that the calculation of the respective tap weights or filter coefficients used by both of these devices is a joint optimization problem, generally meaning that the two sets of filter coefficients preferably should be calculated at the same time and by the same physical layer (PHY) device. The filter coefficients can be calculated using any one of a number of known techniques, including direct calculation techniques or adaptive algorithm techniques, such as the least mean squares algorithm. The PHY device typically used to calculate both sets of filter coefficients is the one implementing the receiver (referred to as the receiver PHY device), which is in communication with the transmitter at the other PHY device (referred to as the transmitter PHY device). After the filter coefficients for the FBF in the precoder are calculated, the receiver PHY device can then send them, using its own transmitter, to the transmitter PHY device.

The problem with this is that many communication standards do not provide a mechanism to continually perform this process. Instead, the coefficients for the FBF in the precoder are usually only derived once at the receiver PHY device and then fed back to the transmitter PHY device at startup, before application-level data is exchanged between the two devices. Because ISI can change over time with temperature, positioning, and the impedance of the communication medium or the channel noise may change, for example, the inability to continually adapt the precoder at the transmitter PHY device can lead to an increased bit-error rate. 10GBASE-T is one such communication standard that only provides a mechanism for exchanging coefficients for the FBF in the precoder at startup, before application-level data is exchanged.

Figure 4:
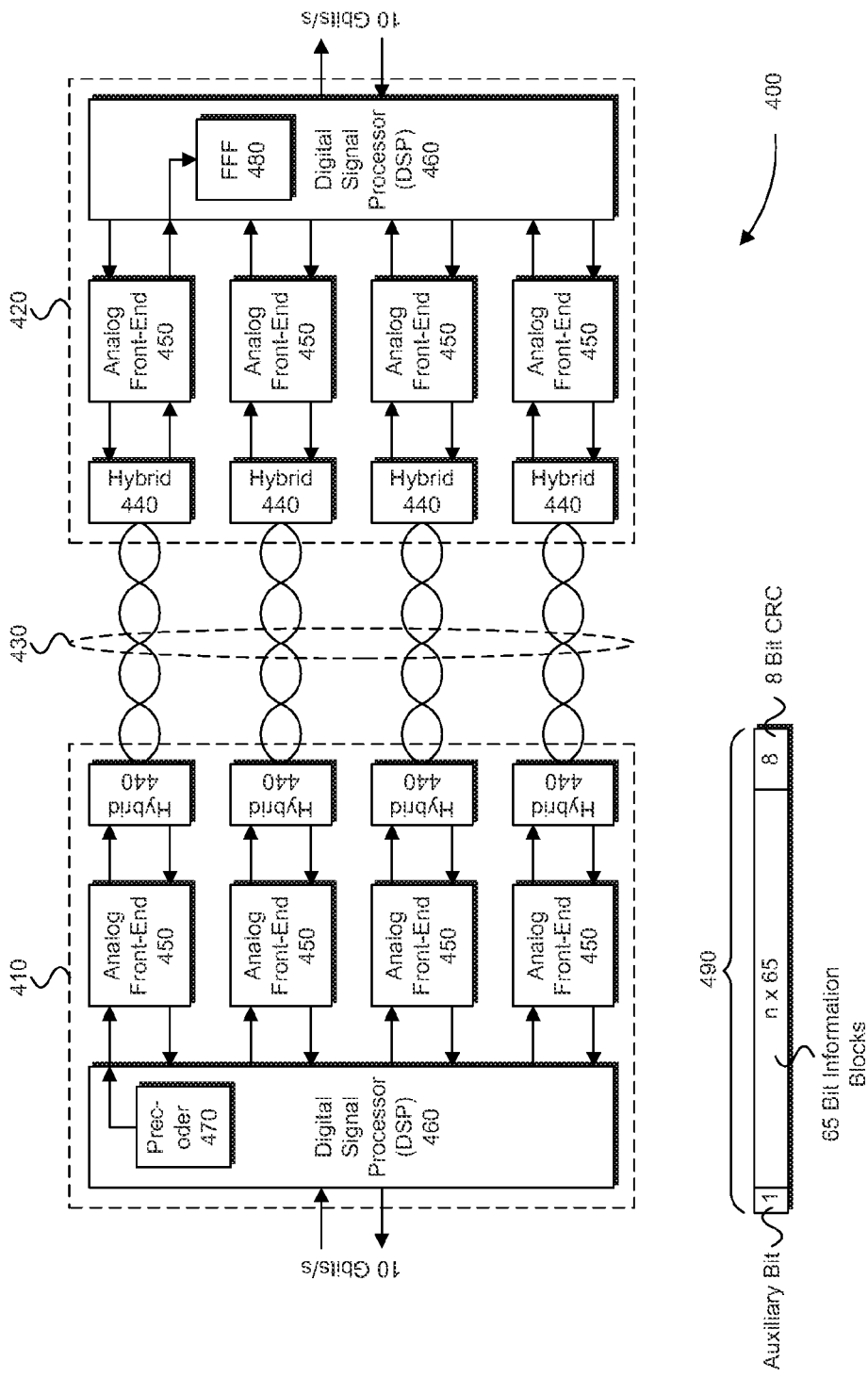
FIG. 4 illustrates an exemplary high-level block diagram of a 10GBASE-T system in accordance with embodiments of the present disclosure.

FIG. 4 illustrates an exemplary high-level block diagram of a 10GBASE-T system 400 in accordance with embodiments of the present disclosure. As shown in FIG. 4, 10GBASE-T system 400 includes two PHY devices 410 and 420 coupled together by four pairs of copper transmission lines 430 that can be, for example, category 5, 6, or 7 cables with lengths up to 100 meters. Although not specifically delineated in FIG. 4, each PHY device 410 and 420 includes four transceivers that are each coupled to a respective one of the four pairs of copper transmission lines 430. Each transceiver is specifically formed by a hybrid transformer 440, an analog front end 450, and shared and/or separate functionality in a digital signal processor (DSP) 460.

In operation, the transceivers are configured to transmit and receive data over a respective one of the pairs of copper transmission lines 430 at a rate 2.5 gigabits per second to provide an overall aggregate data rate of 10 gigabits per second between PHY devices 410 and 420. The transmit and receive signals of each transceiver are sent and received at the same time over their respective one of the pairs of copper transmission lines 430 using hybrid transformers 440. In the case of receive signals, analog front-ends 450 can be used to perform filtering, amplification, and analog-to-digital conversion. For transmit signals, analog front-ends 450 can be used to perform digital-to-analog conversion, amplification, and filtering.

DSPs 460 are configured to perform several functions. For example, in the transmit direction, DSPs 460 are configured to construct PHY frame payloads for transmission over the four pairs of copper transmission lines 430. The PHY frame payloads include 50, 65-bit blocks of information that have been aggregated together, an auxiliary bit, and a cyclical redundancy check. An example PHY frame payload 490 is shown at the bottom of FIG. 4. The auxiliary bit is undefined by the 10GBASE-T standard and can be used by a vendor for a vendor specific purpose, for example. After being constructed, each PHY frame payload is typically encoded (at least in part) by a forward-error correction code and then mapped to symbols. The symbols are then processed by precoders, like precoder 300 in FIG. 3, that use THP to pre-equalize the symbols for post-cursor ISI. One such precoder 470 is shown as part of the transmitter chain of the top most illustrated transceiver of PHY device 410. The precoded symbols are provided to analog front-ends 450 and hybrid transformers 440 for transmission over pairs of transmission lines 430. In the receive direction, DSPs 460 are configured, for example, to process received symbols using FFFs, like FFF 110 in FIG. 1, to remove pre-cursor ISI and to decode the symbols to correct for transmission errors. One such FFF 480 is shown as part of the receiver chain of top most illustrated transceiver of PHY device 420.

The following refers to the transmitter in the top most illustrated transceiver of PHY device 410 and to the receiver to which it is coupled to in the top most illustrated transceiver of PHY device 420. In accordance with the 10GBASE-T standard, this exemplary transmitter/receiver pair is only configured to exchange coefficients for the FBF in precoder 470 at startup, before application-level data is exchanged. More specifically, the top most illustrated transceiver of PHY device 420 is configured to jointly determine the coefficients for both precoder 470 and FFF 480 only at startup and then feed the coefficients for the FBF in precoder 470, using its own transmitter, back to precoder 470.

The system and method of the present disclosure are configured to exploit the undefined, auxiliary bit appended to the 10GBASE-T PHY frame payload, which is shown in example PHY frame payload 490, to continually or repeatedly send updates to the coefficients of precoder 470. Specifically, DSP 460 in PHY device 420 can include hardware and/or software to jointly determine the coefficients for both precoder 470 and FFF 480 on a continual or repeated basis to account for changing channel conditions and then utilize the auxiliary bit over a number of PHY frame payloads to feed the coefficients for precoder 470 back to precoder 470.

In one embodiment, the auxiliary bit provides a data rate of 3.125 megabits per second, and precoder 470 has 16, 8-bit coefficients. Assuming the other three transceivers in PHY device 410 include their own precoders that similarly each have 16, 8-bit coefficients, then a total of 512 bits will be need to be transmitted to PHY device 410 from PHY device 420 to fully update the coefficients for all precoders in PHY device 410. At the auxiliary bit rate of 3.125 megabits per second, transmission of the 512 bits will take around 0.16 milliseconds. This time is generally short enough to quickly adapt to changing channel environments.

It should be noted that PHY devices 410 and 420 can be implemented in several different types of devices. For example, PHY devices 410 and 420 can be implemented as part of a switch, router, or network interface card. In addition, although PHY devices 410 and 420 are shown in FIG. 4 as each including only one 10GBASE-T port, each PHY device 410 and 420 can include several additional 10GBASE-T ports.

Figure 5:
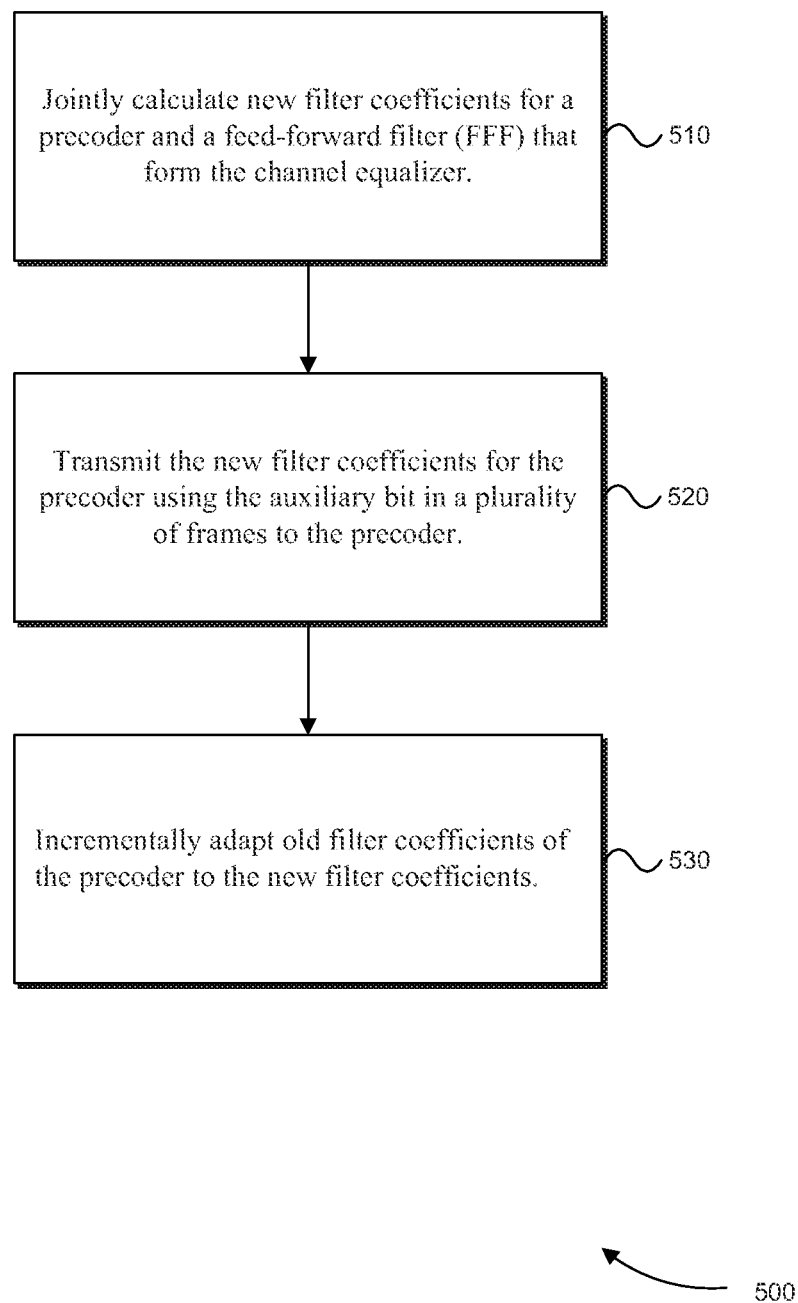
FIG. 5 illustrates a flowchart of an example method for adapting a channel equalizer that includes a precoder configured to perform THP in accordance with embodiments of the present disclosure.

Referring now to FIG. 5, a flowchart 500 of an example method for adapting a channel equalizer that includes a precoder configured to perform THP is illustrated in accordance with embodiments of the present disclosure. Flowchart 500 is described below in the exemplary context of the transmitter in the top most illustrated transceiver of PHY device 410 and the receiver to which it is coupled to in the top most illustrated transceiver of PHY device 420.

As shown in FIG. 5, the method of flowchart 500 begins at step 510. At step 510, new filter coefficients for precoder 470 and FFF 480 that form the channel equalizer are jointly calculated. These filter coefficients are jointly calculated by the top most transceiver of PHY device 420 illustrated in FIG. 4. More specifically, DSP 460 in PHY device 420 can be used to jointly calculate the filter coefficients using any one of a number of known techniques, including direct calculation techniques or adaptive algorithm techniques, such as the least mean squares algorithm.

At step 520, the newly calculated filter coefficients for precoder 470 are transmitted to precoder 470 over the pairs of copper transmission lines 430 using the auxiliary bit of a plurality of 10GBASE-T transmission frame payloads, which are included in transmission frames. The number of auxiliary bits utilized can depend, for example, on the number of filter coefficients used by the FBF in precoder 470, the number of bits used to represent one or more of those filter coefficients, and on whether an error correction or detection code is used to protect the newly calculated filter coefficients from transmission errors. For example, a simple repetition code or a more sophisticated code can be used as an error correction or detection code to protect the newly calculated filter coefficients from transmission errors.

At step 530, the old filter coefficients of precoder 470 are adapted (or changed) to the newly received filter coefficients. In one embodiment, the adaptation of the old filter coefficients is performed incrementally over time, as opposed to all at once, to allow FFF 480 to adapt to the new THP shape of precoder 470. The incremental adaptation can be performed by linearly changing one or more of the filter coefficients of the FBF in precoder 470 from the old filter coefficient to the new filter coefficient over a series of steps. Alternatively, some non-linear method can be used to change the filter coefficients of the FBF in precoder 470 from the old filter coefficients to the new filter coefficients.

Finally, although not shown in the method of flowchart 500, after the filter coefficients of the FBF in precoder 470 have been updated, the filter coefficients can be held constant for a predetermined or set amount of time to further allow FFF 480 to adapt to the new THP shape of precoder 470. After this predetermined or set amount of time has elapsed, the method of flowchart 500 can be repeated.

It should be noted that, although the system and method of the present disclosure were described above as being implemented in the exemplary context of a 10GBASE-T communication system, the system and method can be implemented in any number of different types of communication systems. For example, the system and method of the present disclosure can be implemented in other types of communication systems that have similar, undefined auxiliary bits in their frame structures that can be used to continually send updates to the filter coefficients of a precoder.

III. EXAMPLE COMPUTER SYSTEM ENVIRONMENT

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 6:
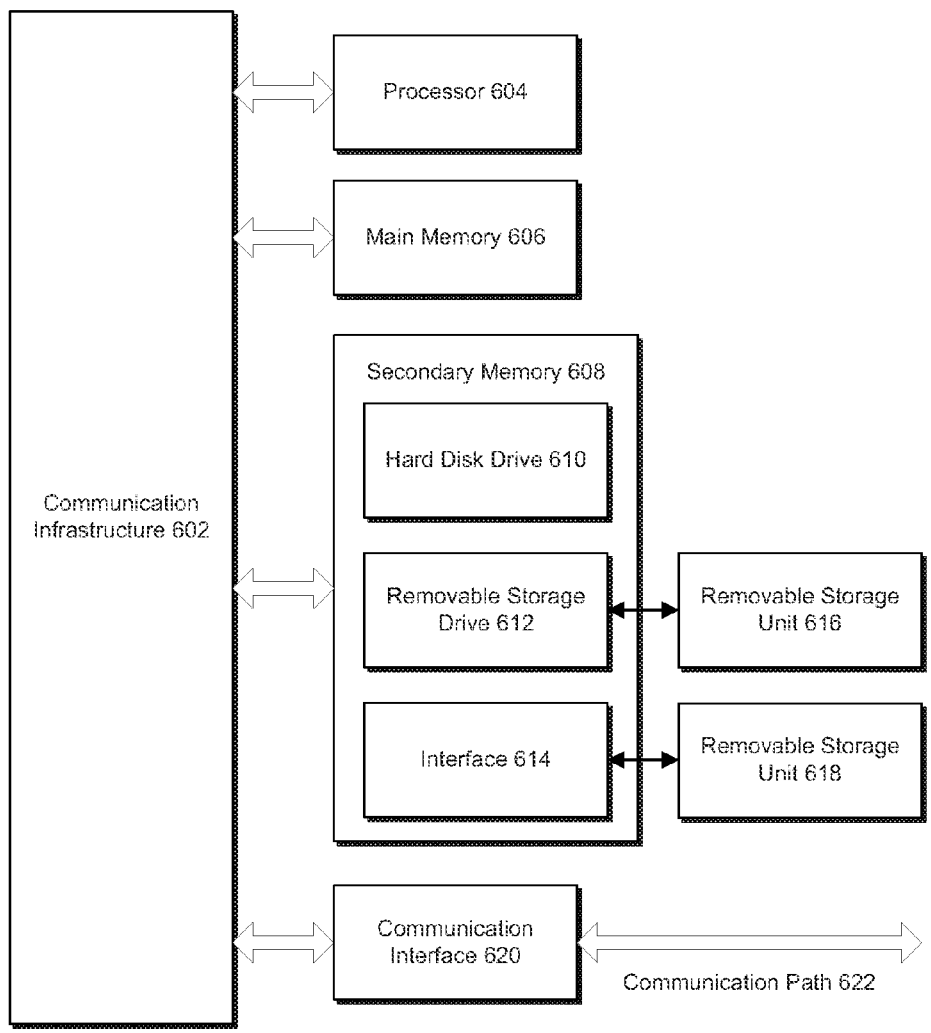
FIG. 6 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 600 is shown in FIG. 6. Modules depicted in FIGS. 1, 3, and 4 may execute on one or more computer systems 600. Furthermore, each of the steps of the method depicted in FIG. 5 can be implemented on one or more computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 720. Communications interface 620 allows software and data to be transferred between computer system 600 and external devices. Examples of communications interface 620 may include a modem, a network interface (such as an Ethernet card), a communications port, a PCMCIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

IV. CONCLUSION

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method for adapting a channel equalizer, the method comprising:
    calculating new filter coefficients for a precoder and a feed-forward filter (FFF) that form the channel equalizer;
    transmitting the new filter coefficients for the precoder, using at least one bit from a plurality of frames, to the precoder, wherein the at least one bit from the plurality of frames is undefined by a communication standard in which the plurality of frames are formatted in accordance with; and
    after old filter coefficients of the precoder are adapted to the new filter coefficients for the precoder, waiting a set amount of time before further adapting the new filter coefficients for the precoder.

2. The method of claim 1, further comprising:
    incrementally adapting the old filter coefficients of the precoder to the new filter coefficients for the precoder over time.

3. The method of claim 2, wherein the old filter coefficients of the precoder are incrementally adapted to the new filter coefficients for the precoder over time in a linear manner.

4. The method of claim 1, wherein the communication standard is the Institute of Electrical and Electronics Engineers (IEEE) 802.3an standard.

5. The method of claim 1, wherein the new filter coefficients for the precoder are transmitted to the precoder over a pair of copper transmission lines.

6. The method of claim 1, wherein the new filter coefficients for the precoder are protected by an error-correction code before being transmitted to the precoder.

7. A method for adapting a channel equalizer, the method comprising:
    calculating new filter coefficients for a precoder and a feed-forward filter (FFF) that form the channel equalizer;
    transmitting the new filter coefficients for the precoder, using at least one bit from a plurality of frames, to the precoder;
    incrementally adapting old filter coefficients of the precoder to the new filter coefficients for the precoder over time; and
    after adapting the old filter coefficients of the precoder to the new filter coefficients for the precoder, waiting a set amount of time before further adapting the new filter coefficients for the precoder.

8. The method of claim 7, wherein a purpose of the at least one bit from the plurality of frames is undefined by a communication standard in which the plurality of frames are formatted in accordance with.

9. The method of claim 8, wherein the communication standard is the Institute of Electrical and Electronics Engineers (IEEE) 802.3an standard.

10. The method of claim 7, wherein the old filter coefficients of the precoder are incrementally adapted to the new filter coefficients for the precoder in a linear manner.

11. The method of claim 7, wherein the new filter coefficients for the precoder are transmitted to the precoder over a pair of copper transmission lines.

12. The method of claim 7, wherein the new filter coefficients for the precoder are protected by an error-correction code before being transmitted to the precoder.

13. A physical layer (PHY) device comprising:
    a hybrid transformer configured to couple the PHY device to a communication medium for transmitting a plurality of frames over the communication medium; and
    a digital signal processor (DSP) configured to calculate new filter coefficients for a precoder and a feed-forward filter (FFF) that form a channel equalizer, transmit the new filter coefficients for the precoder using at least one bit from the plurality of frames to the precoder, and wait a set amount of time after old filter coefficients of the precoder have been fully adapted to the new filter coefficients for the precoder before further adapting the new filter coefficients for the precoder,
    wherein the at least one bit from the plurality of frames is undefined by a communication standard in which the plurality of frames are formatted in accordance with.

14. The PHY device of claim 13, wherein the communication standard is the Institute of Electrical and Electronics Engineers (IEEE) 802.3an standard.

15. The PHY device of claim 13, wherein the communication medium is a pair of copper transmission lines.

16. The PHY device of claim 13, wherein the new filter coefficients for the precoder are protected by an error correction or detection code before being transmitted to the precoder.

17. The PHY device of claim 13, wherein the old filter coefficients of the precoder are configured to be incrementally adapted to the new filter coefficients for the precoder over time.

18. The PHY device of claim 13, wherein the new filter coefficients for the precoder are calculated to compensate for a change in the communication medium.

19. A method for adapting a channel equalizer, the method comprising:
- calculating new filter coefficients for a precoder and a feed-forward filter (FFF) that form the channel equalizer; and
- transmitting the new filter coefficients for the precoder, using at least one bit from a plurality of frames, to the precoder,
- wherein the at least one bit from the plurality of frames is undefined by a communication standard in which the plurality of frames are formatted in accordance with, and
- wherein the communication standard is the Institute of Electrical and Electronics Engineers (IEEE) 802.3an standard.

20. The method of claim 19, further comprising:
- incrementally adapting old filter coefficients of the precoder to the new filter coefficients for the precoder over time.

* * * * *